(12) United States Patent
Helfenstein

(10) Patent No.: US 11,243,104 B2
(45) Date of Patent: Feb. 8, 2022

(54) ULTRASONIC FLOWMETER HAVING A DEPOSITION-RESISTANT REFLECTOR FORMED OF A BIONIC SURFACE

(71) Applicant: GWF MessSysteme AG, Lucerne (CH)

(72) Inventor: Markus Helfenstein, Lucerne (CH)

(73) Assignee: GWF MessSysteme AG, Lucerne (CH)

( * ) Notice: Subject to any disclaimer, the term of this patent is extended or adjusted under 35 U.S.C. 154(b) by 121 days.

(21) Appl. No.: 16/632,400

(22) PCT Filed: Aug. 7, 2018

(86) PCT No.: PCT/EP2018/071396
§ 371 (c)(1),
(2) Date: Jan. 20, 2020

(87) PCT Pub. No.: WO2019/030227
PCT Pub. Date: Feb. 14, 2019

(65) Prior Publication Data
US 2020/0249060 A1   Aug. 6, 2020

(30) Foreign Application Priority Data

Aug. 8, 2017   (DE) .................. 10 2017 118 020.6

(51) Int. Cl.
  *G01F 1/66* (2006.01)
  *C09D 5/16* (2006.01)
(52) U.S. Cl.
  CPC ........... *G01F 1/662* (2013.01); *C09D 5/1681* (2013.01); *G01F 1/667* (2013.01)

(58) Field of Classification Search
None
See application file for complete search history.

(56) References Cited

U.S. PATENT DOCUMENTS

| 8,939,034 B2 | 1/2015 | Berger et al. | |
| 2006/0196278 A1* | 9/2006 | Kroemer | G01F 1/667 73/861.18 |
| 2016/0014923 A1* | 1/2016 | Stevens | C09D 5/00 428/698 |

FOREIGN PATENT DOCUMENTS

| CN | 202693159 U | 1/2013 |
| CN | 104532238 A1 | 4/2015 |
| EP | 392294 A | 10/1990 |
| EP | 0392294 A1 | 10/1990 |
| EP | 0890826 B1 | 11/2009 |
| EP | 2306160 A1 | 4/2011 |
| EP | 2386836 B1 | 1/2016 |
| WO | 2008025538 A1 | 3/2008 |

OTHER PUBLICATIONS

Soft Matter, 2012, 8, (pp. 11271-11284)—Bioinspired rice leaf and butterfly wing surface structures combining sharkskin and lotus effects by Gregory D. Bixler and Bharat Bhushan—Aug. 2012.*
International Search Report and Written Opinion for PCT/EP2018/071396 dated Oct. 23, 2018 (11 pages; with English translation).

(Continued)

*Primary Examiner* — Harshad R Patel
(74) *Attorney, Agent, or Firm* — Mindful IP PLLC

(57) ABSTRACT

Disclosed is a flow meter comprising at least two measuring sensors spaced apart from each other, preferably ultrasonic sensors, whose measuring signals are reflected by a deposition-resistant reflector.

8 Claims, 5 Drawing Sheets

(56) References Cited

OTHER PUBLICATIONS

Notification of Transmittal of Translation, International Preliminary Report on Patentability and Written Opinion of the International Searching Authority dated Feb. 20, 2020 regarding International Application No. PCT/EP2018/071396 (8 pages).
Office Action from China National Intellectual Property Administration for patent application CN201880050993.X with English translation dated Feb. 2, 2021.
European Patent Office 71.3 Communication Regarding Sibling patent application EP 18752147.1-1001 with English Machine Translation.
Russian Search Report dated Sep. 8, 2021 re PCT/EP2018/071396, original with English translation (4 pages).
Russian Office Action dated Aug. 31, 2021 re corresponding Russian Application No. 2020109723/28 (016060), original with English translation (9 pages).

\* cited by examiner

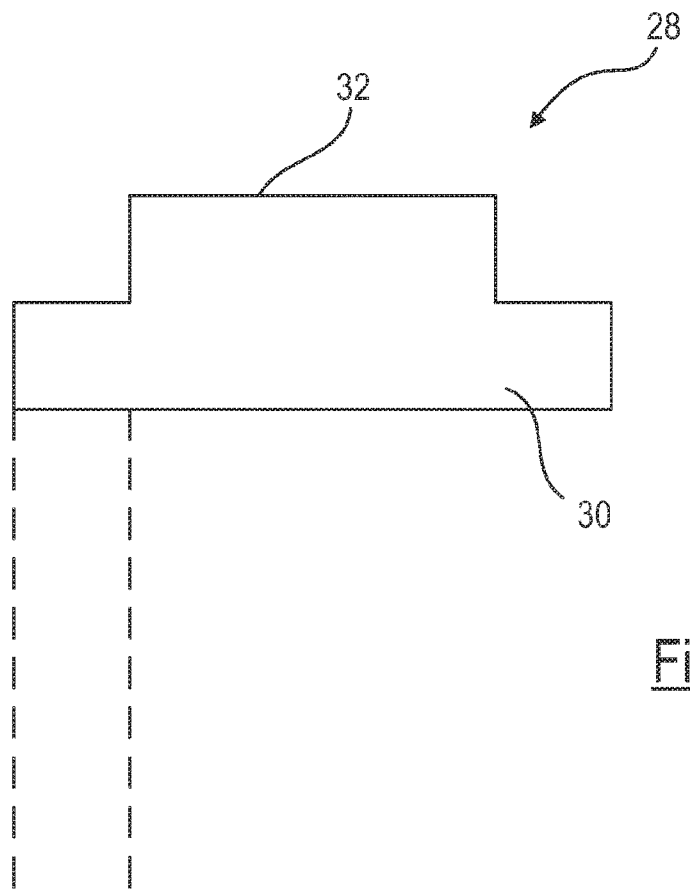
Fig. 2
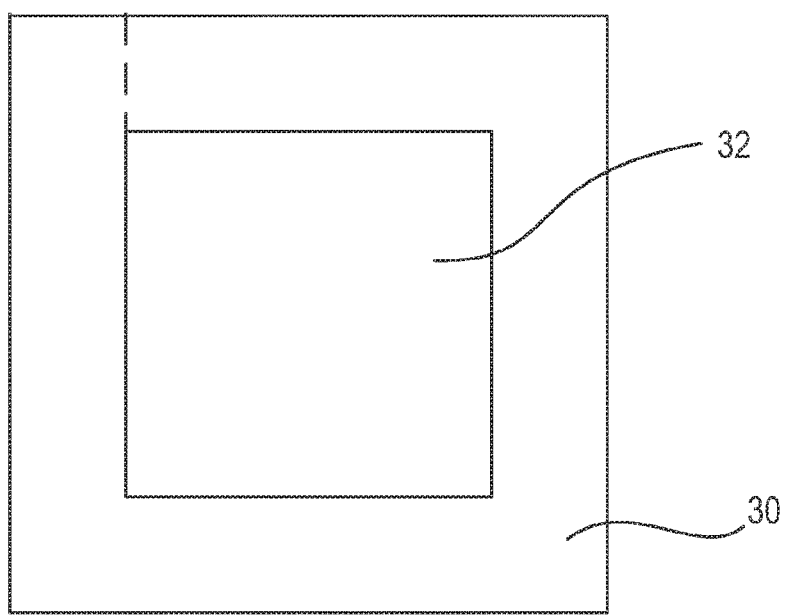

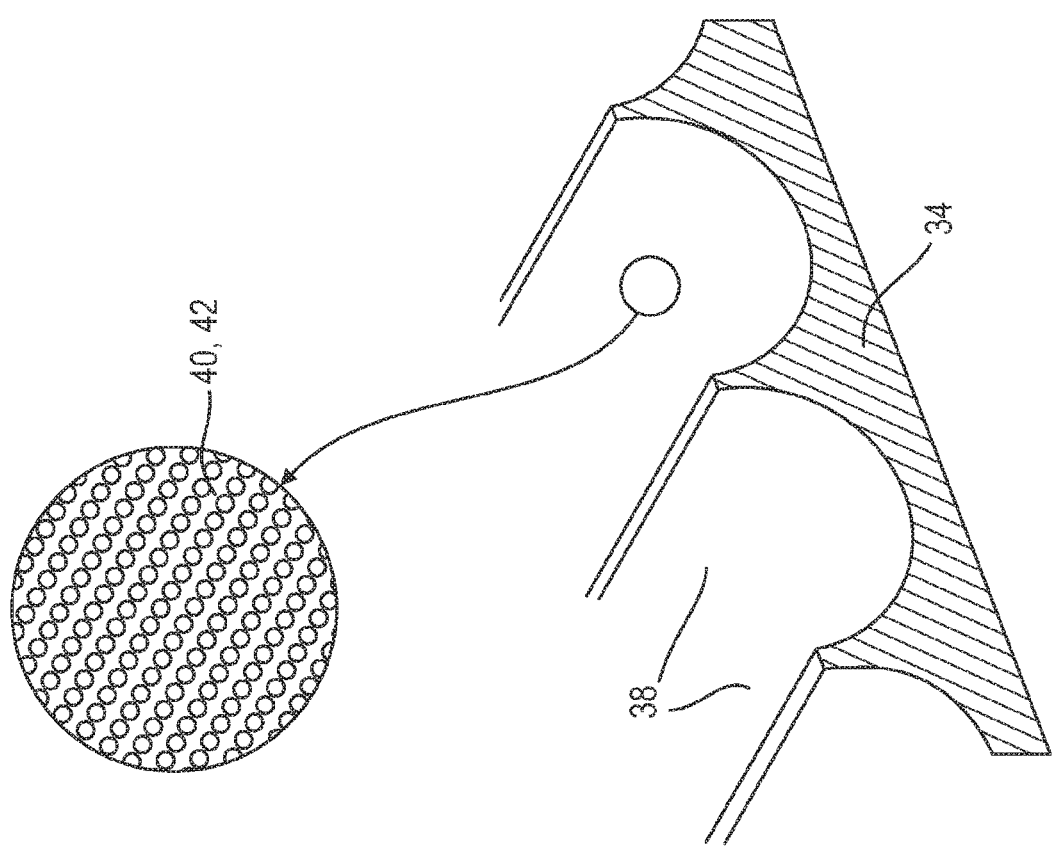

ULTRASONIC FLOWMETER HAVING A DEPOSITION-RESISTANT REFLECTOR FORMED OF A BIONIC SURFACE

CROSS-REFERENCE TO RELATED APPLICATIONS

This application is a national stage of, and claims priority to, Patent Cooperation Treaty Application No. PCT/EP2018/071396, filed on Aug. 7, 2018, which application claims priority to German Application No. DE 10 2017 118 020.6, filed on Aug. 8, 2017, which applications are hereby incorporated herein by reference in their entireties.

DESCRIPTION

Disclosed is a flow meter for measuring the flow of fluids in a pipeline or the like and to a reflector suited for such flow meter.

In EP 2 306 160 A1 a flow meter/flow counter is disclosed in which the measuring insert receives the ultrasonic converter as well as forms the actual measuring channel. Accordingly, a profile body forming the measuring channel which influences the flow within the measuring range and at which reflectors for the measuring signals are additionally provided immerses through a recess of the pipe section encompassed by a flange.

A similar solution is shown in EP 2 386 836 B1. The flow passage inside the measuring channel is determined by a housing insert adapted to be inserted from the end face of the housing which also supports reflectors for the ultrasonic signals so that the ultrasound is output by one of the ultrasonic converters and is reflected to the other ultrasonic converter which is located downstream, for example, via the reflectors. As a matter of course, the signal may also be guided in the inverse direction.

In the document EP 0 890 826 B1 a flow meter is described in which equally in the area of a pipe section of a housing a measuring insert is attached to a tangentially extending flange. The ultrasound energy is deflected in helical shape by plural reflection surfaces fastened to the bottom, to the sidewalls and to the cover of the insert. Plural inserts made from plastic are provided to receive the reflectors and to position the latter with high accuracy.

It is a drawback in such solutions that by particles, sediments and similar components in the fluid deposits may form on the reflector, which may result in a deterioration of the signal quality.

In contrast, the object underlying the disclosure is to provide a flow meter/flow counter and a reflector which achieve a measurement with an improved measuring accuracy and an improved signal quality.

This object is achieved, with respect to the flow meter and to the reflector, by features as disclosed herein.

The reflector, preferably inserted to be flush, has a reflection surface whose surface structure is configured so that there is no potential contact surface for dirt deposits which may occur despite reduced turbulences and stalls. With very low flow volume and accompanying slow flow velocities, dirt deposits in the form of sediments and/or other suspended particles are deposited in the fluid, due to gravitation, at the reflector-side transverse wall of the measuring channel, if the reflector-side transverse wall is arranged in the direction of the gravitational force. Due to the nature of the surface of the reflector a deposition on the latter almost becomes impossible, even at low flow velocities, so that a reflection of the measuring signals and an accompanying high signal quality are permanently ensured. In order to further counteract the depositions, the entire measuring channel might be swiveled along the axis of the flow direction so that the reflector-side transverse wall is not located in the direction of the gravitational force.

According to an example, a reflector which is preferably inserted to be flush with a pocket of the transverse wall is arranged at the transverse wall remote from the ultrasonic converters. Due to the flush insertion of the reflector/mirror and/or of the sensors/coupling pieces into the measuring channel turbulences and stalls in the area of said components and an accompanying dirt deposit and the signal falsification resulting therefrom are prevented. It is also imaginable that more than one reflector is arranged in the measuring channel. An arrangement of three reflectors, two at the transverse wall opposite to the sensors and one between the sensors so that a W-shaped signal path is formed, is applicable for lengthening the signal path and thus for increasing the measuring accuracy.

For improving the deposition resistance, the surface structure is formed to be preferably bionic. Such formation entails advantages in the fields of friction, wear, lubrication, wetting, self-cleaning and anti-fouling. Surprisingly, it has turned out that, as compared to a smooth surface, a specifically structured surface according to a biological model (bionic) achieves the desired functions such as deposition resistance while still ensuring sufficient reflection. The surface structure may also be formed at a coating of the reflector.

One example of a bionic surface constitutes a surface having a sharkskin effect (riblet effect). A surface of such design lastingly reduces the resistance in fluids and prevents depositions as well as growths of any type of organisms (anti-fouling). The sharkskin effect is caused, inter alia, by longitudinal micro grooves on the surface. Ideally, the latter are in the form of blades and are perpendicular to the surface. However, also a shape to be manufactured in a facilitated manner as a type of wave profile (scalloped) entails the desired effect. The ratio between the height of the longitudinal grooves and the distance thereof depends on the flow velocity of the fluid flowing around and should be within the range of from 0.4 to 0.9, ideally within the range of 0.7, when the flow velocity amounts to 5 m/s. In this example, the rib height (h) is 50 μm and the rib space (s) is 70 μm.

Another example of a bionic surface is a surface having a lotus effect, i.e., the surface is provided with a super hydrophobic layer on which the contact surface of a fluid makes up only a few percent of the fluid surface. This effect is brought about by structural elevations in the bionic surface which do not impair reflection of the ultrasonic waves.

Another suited variant of a bionic surface is a surface having a rice leaf effect, that is, that differently high elevations are placed on the surface in the direction of flow of the fluid. Said elevations are arranged transversely to the direction of flow, wherein some elevations show half the height of the others and, having an equal diameter, are spaced apart from each other by the double diameter, when viewed from a center of one elevation to a center of the next elevation.

In a flow meter according to the disclosure the sidewalls of a measuring channel extending in the direction of a vertical axis (approximately in the transmitting and receiving direction of the ultrasonic signals) are bulged and form an oval shape with approximately planar or slightly bulged transverse walls extending approximately in the direction of the transverse axis. Surprisingly, it turned out that such oval geometry ensures an optimum flow and an accompanying maximum signal quality.

The afore-described bionic surfaces are optimized with respect to their function as ultrasonic reflectors.

BRIEF DESCRIPTION OF DRAWINGS

Hereinafter examples will be illustrated in detail by way of schematic drawings, wherein:

FIG. 2 represents a schematic view of a reflector;

FIG. 5 shows a schematic representation of a reflector surface layer with a combination of sharkskin and rice leaf effect.

DETAILED DESCRIPTION

Figure 1:
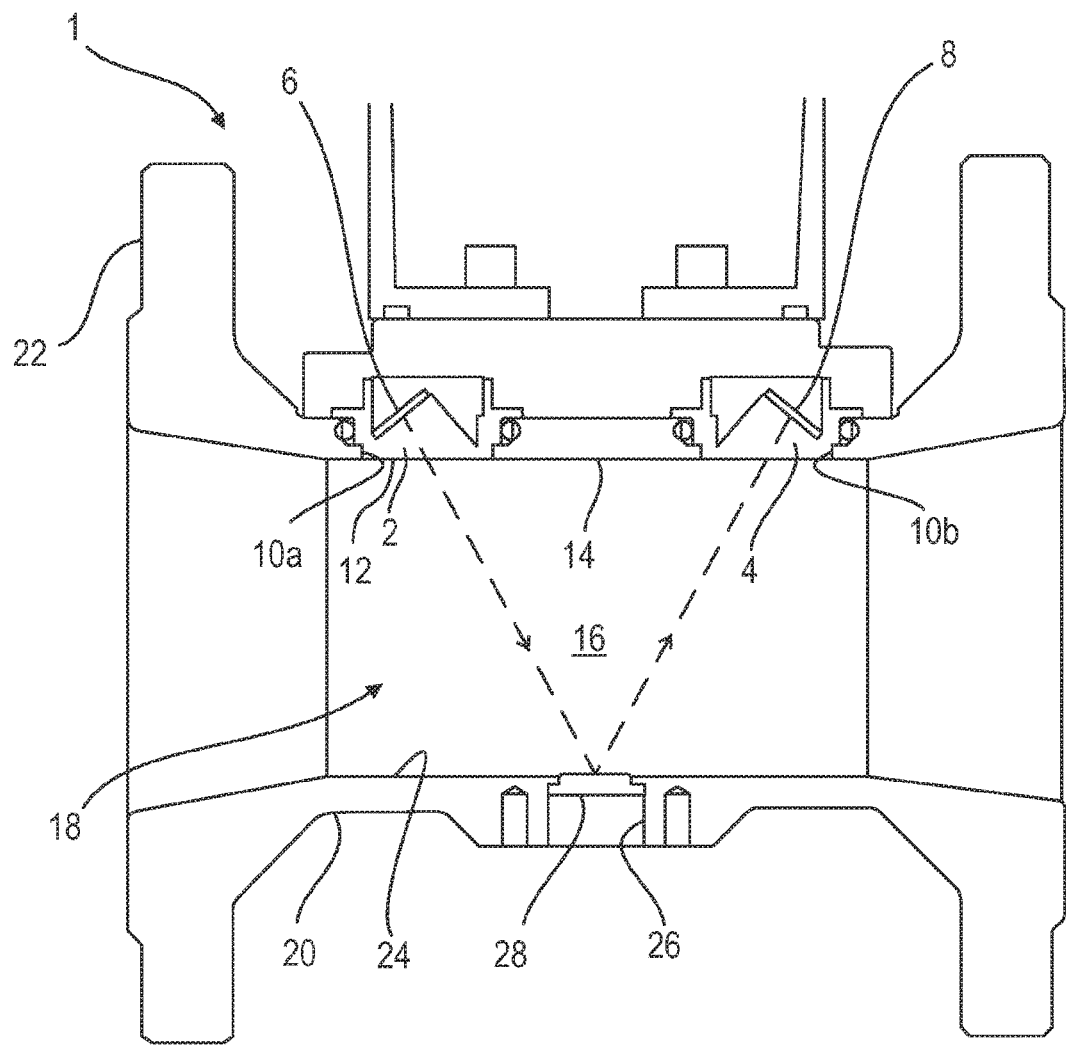
FIG. 1 shows an example of a flow meter comprising a reflector.

FIG. 1 illustrates a longitudinal section of a flow meter 1. From this view, two coupling pieces 2, 4 including two sensors 6 and, resp., 8 are evident. These are inserted in two respective recesses 10a, 10b. The coupling surfaces 12 extend flush with the circumferential wall (transverse wall 14 and adjacent areas of sidewalls 16) of a measuring channel 18 which is formed by a pipe section 20 in this example. Thus, a part of a flange 22 forms the transverse wall 14. In this example, an opposite transverse wall 24 is formed to have an outwardly open pocket 26 in which a reflector 28 is inserted.

FIG. 2 illustrates a possible example of the reflector 28 in the measuring channel 18 according to FIG. 1. In such configuration, the reflector 28 is pressed into the pocket. Therefore, it is provided to configure the reflector 28 with a base area 30. In a different form of insert, the shape can be differently configured. It is of particular significance that the base material of the reflector 28 is a material which is properly reflecting ultrasound. Here, e.g., a steel-containing or else a polymeric structure can be used, wherein also any other material which is properly reflecting ultrasound would be imaginable. A surface layer 32 is applied to said base material. The surface layer 32 is formed to be deposition-resistant, which will be further discussed in the following figures.

Figure 3:
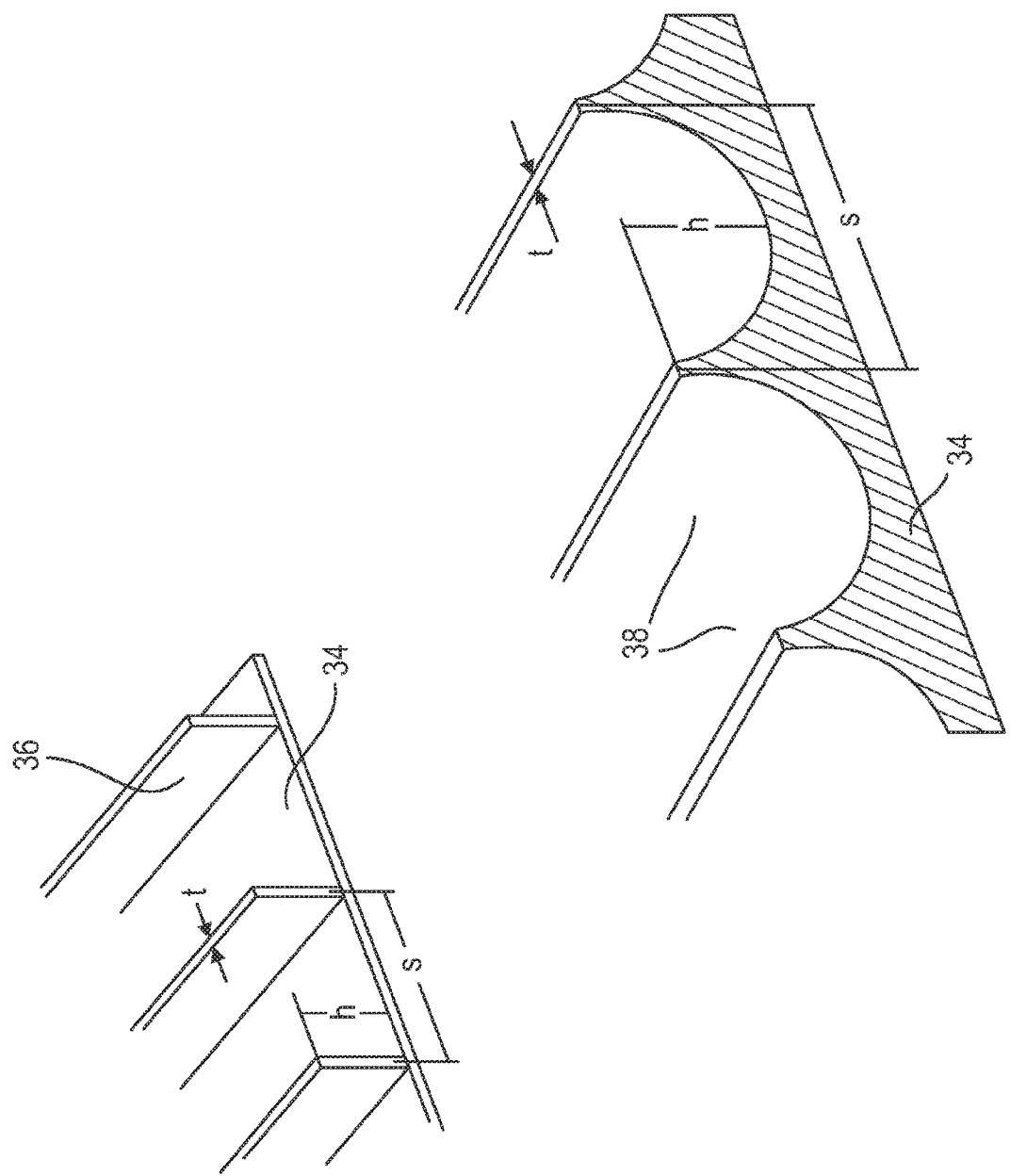
FIG. 3 schematically shows a surface structure having a sharkskin effect.

FIG. 3 schematically shows in which way a surface can be designed with the sharkskin effect. On a base area 34 longitudinal micro grooves 36 are provided. Said longitudinal grooves excel by uniform height h and width t. The distance s relative to each other is also identical over the entire area. Said longitudinal micro grooves 36 can be applied to the base material 34, for example, by mechanical machining of the base material 34 or by a very fine casting or injection molding process. Due to the filigree structure, in terms of manufacture a wave structure 38 having equal dimensions can be produced at reduced cost. The reflection and the resistance to deposition are unlimited in the case of grooves in the wave structure 38.

Figure 4:
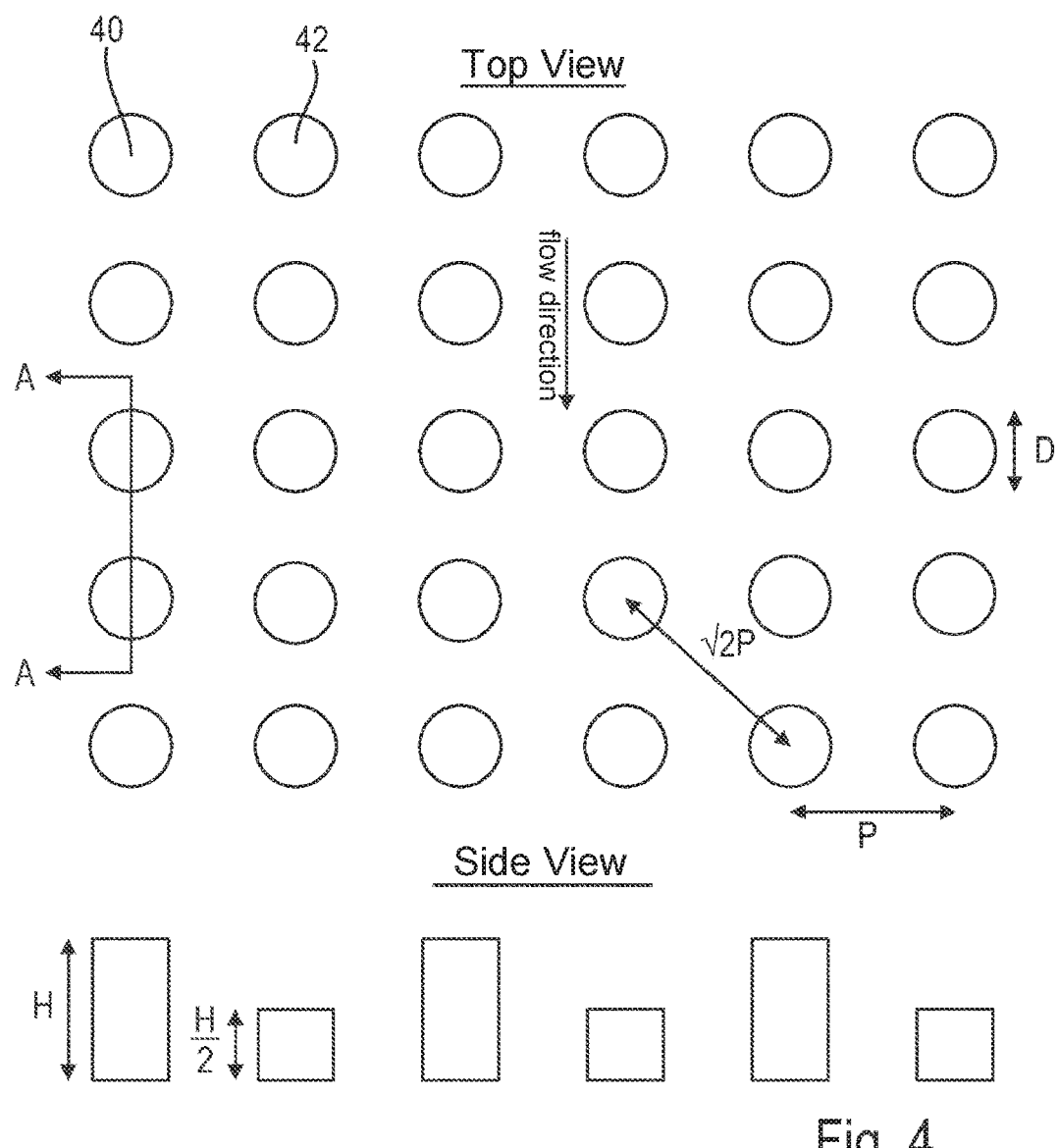
FIG. 4 shows a schematic representation of a surface layer producing the rice leaf effect.

FIG. 4 schematically illustrates the microscopic design of the structure of a rice leaf. The effect of the resistance to deposition occurring in this way is due to said structure. Thereby, individual elevations 40, 42 are applied to the surface. The smaller elevations 42 have half the height of the larger elevations 40, for example. When viewed in a direction of flow, the elevations 40, 42 are arranged to be juxtaposed in rows, whereby one row of large elevations 40 at a time alternating with one row of small elevations 42. Apart from the different height, the elevations are identically designed so that the diameter D and the distances P are identical to one another.

FIG. 5 forms a combination of the two FIGS. 3 and 4. In this representation, the wave structure 38 of the sharkskin effect is visible in connection with the elevations 40, 42 that are responsible for the rice leaf effect. It should be observed in this context that the representation has a uniform height of the elevations. A variant having the afore-described differently high elevations is not shown.

It has turned out that the afore-described coatings or structuring of the reflector 28 are suited to prevent deposition during use or at least to impede the formation of depositions.

Disclosed is a flow meter comprising at least two measuring sensors spaced apart from each other, preferably ultrasonic sensors, whose measuring signals are reflected by a deposition-resistant reflector.

LIST OF REFERENCE NUMERALS 1 flow meter
2 coupling piece
4 coupling piece
6 sensor
8 sensor
10 recess
12 coupling surface
14 transverse wall
16 sidewall
18 measuring channel
20 pipe section
22 flange
24 transverse wall
26 pocket
28 reflector
30 base area
32 surface layer
34 base area
36 longitudinal micro grooves
38 wave structure
40 large elevation
42 small elevation

The invention claimed is:

1. A flow meter comprising a measuring channel adapted to be inserted in a pipe section through which fluid is flowing, in which measuring channel at least two ultrasonic sensors are arranged, wherein a reflector is arranged at a transverse wall of the measuring channel remote from the ultrasonic sensors, the reflector having a deposition-resistant surface structure, wherein a deposition resistance of the reflector is achieved by a bionic structure.

2. The flow meter according to claim 1, wherein the bionic structure has a sharkskin effect.

3. The flow meter according to claim 1, wherein the bionic structure has a lotus effect.

4. The flow meter according to claim 1, wherein the bionic structure has a rice leaf effect.

5. The flow meter according to claim 1, wherein the bionic structure has a combination of a sharkskin effect and/or a lotus effect and/or a rice leaf effect.

6. The flow meter according to claim 1, wherein the measuring channel has an oval shape.

7. The flow meter according to claim 1, wherein the reflector is inserted to be flush with the measuring channel and/or is inserted in a pocket of the measuring channel.

8. A reflector included in a measuring channel of a flow meter the reflector comprising, a deposition-resistant surface wherein the measuring channel is adapted to be inserted in a pipe section through which fluid is flowing in which at least two ultrasonic sensors are arranged, and further wherein the reflector is arranged at a transverse wall of the measuring channel remote from the sensors and a deposition resistance of the reflector is achieved by a bionic structure.

* * * * *